US012526694B2

(12) United States Patent
Li et al.

(10) Patent No.: US 12,526,694 B2
(45) Date of Patent: Jan. 13, 2026

(54) DATA TRANSMISSION METHOD AND PRIMARY DEVICE

(71) Applicants: Beijing ESWIN Computing Technology Co., Ltd., Beijing (CN); Guangzhou Transa Semi Information Technology Co., Ltd., Guangzhou (CN)

(72) Inventors: Xiao Li, Beijing (CN); Xinghua Li, Beijing (CN)

(73) Assignees: Beijing ESWIN Computing Technology Co., Ltd., Beijing (CN); Guangzhou Transa Semi Information Technology Co., Ltd., Guangzhou (CN)

( * ) Notice: Subject to any disclaimer, the term of this patent is extended or adjusted under 35 U.S.C. 154(b) by 342 days.

(21) Appl. No.: 18/146,959

(22) Filed: Dec. 27, 2022

(65) Prior Publication Data
US 2023/0133896 A1 May 4, 2023

(30) Foreign Application Priority Data
Aug. 29, 2022 (CN) .......................... 202211041364.5

(51) Int. Cl.
*H04W 28/14* (2009.01)
*H04L 1/16* (2023.01)
(52) U.S. Cl.
CPC .............. *H04W 28/14* (2013.01); *H04L 1/16* (2013.01)

(58) Field of Classification Search
CPC ..... H04W 28/10; H04W 28/12; H04W 28/14; H04W 84/12; H04W 74/0808; H04W 74/0816; H04W 72/0446; H04L 1/12; H04L 1/16
See application file for complete search history.

(56) References Cited

U.S. PATENT DOCUMENTS 10,812,399 B2 * 10/2020 Sugimoto ............... H04L 47/27
2015/0146648 A1 * 5/2015 Viger .................... H04L 1/1685
370/329

(Continued)

FOREIGN PATENT DOCUMENTS

CN 201180000963 .6 12/2016
CN 201510478302 .4 6/2019

*Primary Examiner* — Peter Chen

(57) ABSTRACT

The present application discloses a data transmission method, a primary apparatus, and a wireless network communication technology chip, and relates to the technical field of communications. An object of the present application is mainly to reduce the dependence of data transmission on the size of a storage space of a wireless communication apparatus; the main technical solutions include: attribute information corresponding to a first number of data frames and number information carrying the first number are transmitted to a wireless communication apparatus, wherein the first number is not greater than a first threshold value, and the first threshold value is determined through negotiation between the wireless communication apparatus and the data receiving apparatus; the first number of data frames is transmitted to the wireless communication apparatus for the wireless communication apparatus to aggregate the data frames based on the first number carried by the attribute information and the number information.

11 Claims, 4 Drawing Sheets

(56) References Cited

U.S. PATENT DOCUMENTS

2015/0222562 A1* 8/2015 Ashokan ................ H04L 47/27
370/412
2016/0205011 A1* 7/2016 Yang ...................... H04L 43/50
370/252

* cited by examiner performing aggregation processing on data frames transmitted by a primary apparatus based on attribute information corresponding to a first number of data frames and carrying the first number of data frames, and storing the aggregated data frames in a first in first out caching area; wherein the attribute information and the number information are provided by the primary apparatus, and the first number is not greater than a first threshold value, and the first threshold value is determined through negotiation between the wireless communication apparatus and the data receiving apparatus; and ⎯ 201 transmitting a data frame of the first in first out caching area to the data receiving apparatus ⎯ 202

FIG. 3

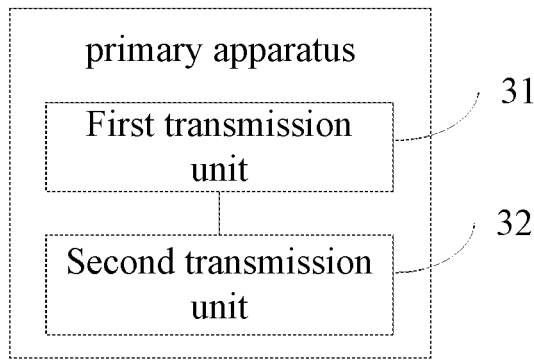

FIG. 4

DATA TRANSMISSION METHOD AND PRIMARY DEVICE

CROSSREFERENCE TO RELATED APPLICATION

This application claims priority to Chinese Patent Application No. CN2022110413645, titled "Data Transmission Method, Primary Apparatus, Wireless Network Communication Technology Chip" and filed to the State Patent Intellectual Property Office on the entire contents of which are incorporated herein by reference.

TECHNICAL FIELD

The present application relates to the technical field of communications, in particular to a data transmission method, a primary apparatus and a wireless network communication technology chip.

BACKGROUND ART

In a wireless local area network, a primary apparatus communicates with a wireless communication apparatus over a bus. The primary apparatus is configured to generate and transmit data frames to the wireless communication apparatus over the bus. A Wireless Fidelity (WiFi) chip operates in a wireless communication apparatus for providing a data path through which data frames provided by a primary apparatus are transmitted to a data receiving apparatus. In order to improve the throughput, the IEEE 802.11 standard adopts aggregation MAC protocol data unit (A-MPDU) transmission, i.e., a wireless communication apparatus encapsulates a data frame provided by a primary apparatus as MPDU (MAC protocol data unit), and after aggregating a plurality of MPDU into one A-MPDU, the aggregated A-MPDU is transmitted to a data receiving apparatus.

At present, the aggregation number of data frames is typically determined by the wireless communication apparatus. The wireless communication apparatus aggregates the received data frames into one A-MPDU if it receives the number of data frames transmitted by the primary apparatus up to the determined aggregation number. The way the wireless communication apparatus determines that the aggregation number has the following two defects: first, a wireless communication apparatus has a limited storage space, and the determined aggregation number depends on the storage space. Since the aggregation number of data frames is directly related to throughput, throughput is severely limited based on the aggregation number depending on the storage space of the wireless communication apparatus. Secondly, when the number of data frames received by the wireless communication apparatus reaches the aggregation number, the wireless communication apparatus aggregates the data frames, so that a large amount of storage space is required in the wireless communication apparatus to store the data frames. As can be seen by the above drawbacks, the way the wireless communication apparatus determines the aggregation number results in data transmissions that are heavily dependent on the storage space of the wireless communication apparatus.

SUMMARY OF THE INVENTION

In view of this, the present application proposes a data transmission method, a primary apparatus, and a wireless network communication technology chip to reduce the requirements of data transmission on the size of a storage space of a wireless communication apparatus.

In order to achieve the above-mentioned object, the present application mainly provides the following technical solutions:

In a first aspect, the present application provides a data transmission method applied to a primary apparatus, the data transmission method comprising the following steps:

transmitting attribute information corresponding to a first number of data frames and number information carrying the first number to the wireless communication apparatus, wherein the first number is not greater than a first threshold value, and the first threshold value is determined through negotiation between the wireless communication apparatus and the data receiving apparatus; and transmitting the first number of data frames to the wireless communication apparatus for the wireless communication apparatus to perform aggregation processing on the data frames based on the attribute information and the first number carried by the number information.

In a data transmission method according to an embodiment of the present application, when data frame transmission is required, a primary apparatus first transmits attribute information corresponding to a first number of data frames and number information carrying the first number to a wireless communication apparatus. The first number of data frames is then transmitted to the wireless communication apparatus for the wireless communication apparatus to aggregate the data frames based on the first number carried by the attribute information and the number information. The first number of data frames required of the present application, the first number of data frames required for aggregating one A-MPDU is determined by the primary apparatus, and the setting of the first number is only related to the first threshold value negotiated by the wireless communication apparatus and the data receiving apparatus, and is independent of the size of the storage space in the wireless communication apparatus. In addition, after transmitting to the wireless communication apparatus the number information carrying the first number and the attribute information corresponding to all the data frames, the wireless communication apparatus has obtained the necessary information required for the aggregation A-MPDU, so that the primary apparatus transmits to the wireless communication apparatus the first number of data frames after transmitting the number information and the attribute information corresponding to all the data frames, so that the wireless communication apparatus performs aggregation processing on the data frames based on the number information and the attribute information. The solution provided by the embodiments of the present application can not only flexibly set the first number based on data transmission requirements, but also can reduce the dependence of data transmission on the size of the storage space of the wireless communication apparatus.

In some embodiments, the transmitting the first number of data frames to the wireless communication apparatus comprises: sequentially transmitting the data frames to a data transmission module of the primary apparatus based on a transmission order corresponding to the first number of data frames, wherein the data transmission module comprises a plurality of first caching spaces for caching data frames; allocating a corresponding first caching space for the data frame, and storing the data frame into the allocated first caching space for each data frame transmitted to the data transmission module; wherein the first caching space allocated for the data frame is a first idle caching space, and the previous first caching space adjacent thereto is currently occupied, and the next first caching space connected thereto is idle at present; and transmitting the data frame stored in the first caching space to the wireless communication apparatus when a transmission condition is satisfied.

In some embodiments, the transmitting the data frames cached in the first caching space to the wireless communication apparatus comprises: detecting whether a first caching space allocated to each target data frame is a first caching space that exists continuously, wherein the target data frame is a data frame transmitted to the data transmission module before satisfying a transmission condition, and the target data frame is a data frame in the first number of data frames; if not, adjusting the first caching space allocated to each of the target data frames so that each of the target data frames is stored in the continuously existing first caching space; and transmitting the target data frames to the wireless communication apparatus according to the transmission order of the first caching space corresponding to each of the target data frames.

In some embodiments, before sequentially transmitting the data frames to a data transmission module of the primary apparatus based on a transmission order corresponding to the first number of data frames, the method further comprises: caching the first number of data frames to a second caching space in the primary apparatus, wherein the second caching space is used for caching data frames; sequentially transmitting the data frames to a data transmission module of the primary apparatus based on a transmission order corresponding to the first number of data frames, comprising: reading data frames from a second caching space corresponding to each data frame in sequence based on a transmission sequence corresponding to the first number of data frames, and transmitting same to the data transmission module.

In some embodiments, after transmitting the first number of data frames to the wireless communication apparatus, the method further comprises: releasing a second caching space corresponding to the data frame when the duration of transmission of the data frame to the wireless communication apparatus reaches a target duration every time after transmitting one data frame to the wireless communication apparatus.

In some embodiments, after transmitting the first number of data frames to the wireless communication apparatus, the method further comprises: releasing a second caching space corresponding to the data frame when the duration of transmission of the data frame to the wireless communication apparatus reaches a target duration every time after transmitting one data frame to the wireless communication apparatus.

In some embodiments, the transmitting attribute information corresponding to a first number of data frames and number information carrying the first number to the wireless communication apparatus comprises: transmitting the attribute information and the number information to the wireless communication apparatus based on a priority corresponding to the first number of data frames.

In some embodiments, after transmitting the first number of data frames to the wireless communication apparatus, the method further comprises: performing retransmission processing on the first data frame after the first number of data frames are all transmitted to the wireless communication apparatus in the case where the wireless communication apparatus feeds back a retransmission notification for a first data frame, wherein the first data frame is a data frame in the first number of data frames which needs to be retransmitted to the wireless communication apparatus.

In some embodiments, the retransmitting the first data frame comprises: transmitting attribute information about all the first data frames and total amount information carrying the total amount of the first data frames to the wireless communication apparatus; and transmitting the first data frame to the wireless communication apparatus for the wireless communication apparatus to aggregate the first data frame based on the first number and the total amount information.

In some embodiments, the retransmitting the first data frame comprises: taking both the data frame to be transmitted with the same priority as the first data frame and the first data frame as a data frame to be selected when there is also a data frame to be transmitted with the same priority as the first data frame; and determining a first number of data frames from the data frames to be selected.

In some embodiments, before transmitting attribute information corresponding to a first number of data frames and number information carrying the first number, the method further comprises: determining a total amount of data frames to be transmitted having the same priority; and setting the first number based on the total amount and the first threshold value.

In a second aspect, the present application provides a data transmission method applied to a wireless network communication technology chip of a wireless communication apparatus, the data transmission method comprising the following steps:

performing aggregation processing on data frames transmitted by a primary apparatus based on attribute information corresponding to a first number of data frames and carrying the first number of data frames, and storing the aggregated data frames in a first in first out (FIFO) caching area; wherein the attribute information and the number information are provided by the primary apparatus, and the first number is not greater than a first threshold value, and the first threshold value is determined through negotiation between the wireless communication apparatus and the data receiving apparatus; and transmitting a data frame of the first in first out caching area to the data receiving apparatus.

According to the data transmission method provided by the present application, when data frame transmission is needed, firstly, the data frames transmitted by primary apparatus carrying a first number of number information and attribute information corresponding to the first number of data frames are wirelessly received. Then aggregation processing is performed on the data frames transmitted by the primary apparatus based on the first number and the attribute information, and the aggregated data frames are stored in a first in first out caching area. Finally, the data frame of the first in first out caching area is transmitted to the data receiving apparatus. According to the solution provided by the embodiments of the present application, the first number of data frames required to aggregate one A-MPDU is determined by the primary apparatus, and the wireless network communication technology chip in the wireless communication apparatus performs aggregation processing according to the first number determined by the primary apparatus. In addition, since the wireless communication apparatus transmits the aggregated data frame to the data receiving apparatus at a certain transmission rate, the aggregated processed data frame may not be transmitted in time, and thus after obtaining the aggregated processed data frame, the aggregated processed data frame is stored in the first in first out caching area. The existence of the first in first out caching area enables the wireless network communication technology chip in the wireless communication apparatus to perform aggregation processing without waiting for the first number of data frames to be stored in the storage space thereof, but performing aggregation processing on the received data frames according to the first number and attribute information transmitted by the primary apparatus along with the incoming of the data frames, and being able to store the aggregated data frames in the first in first out caching area, and timely obtaining data from the first in first out caching area and outputting same to the data receiving apparatus. Therefore, the setting of the first in first out caching area can reduce the size of the storage space in the wireless communication apparatus, thus can reduce the cost of the wireless communication apparatus and improve the market competitiveness of the wireless communication apparatus.

In some embodiments, the performing aggregation processing on data frames transmitted by a primary apparatus based on attribute information corresponding to a first number of data frames and carrying the first number of data frames comprises detecting whether the data frames are received completely based on the data length in the corresponding attribute information every time receiving one of the data frames; if so, adding a physical layer message header to the data frame to obtain an aggregated processed data frame, wherein the physical layer message header is used for aggregating the first number of data frames.

In some embodiments, after adding a physical layer message header to the data frame to obtain an aggregated processed data frame, the method further comprises: determining whether the total amount of the currently received data frames reaches the first number; if so, determining that the aggregation process for the first number of data frames ends.

In some embodiments, the storing the aggregated data frames in a first in first out caching area comprises: allocating a corresponding caching space for the aggregated processed data frame in the first in first out caching area, and caching the aggregated processed data frame to the caching space allocated thereto; wherein the caching space allocated for the data frame is an idle caching space, and the previous caching space adjacent thereto is currently occupied.

In some embodiments, the allocating a corresponding caching space for the aggregated processed data frame in the first in first out caching area comprises: selecting a first in first out caching area, wherein the priority of the selected first in first out caching area is the same as the priority carried by the attribute information; and allocating a corresponding caching space for the aggregated processed data frame in the selected first in first out caching area.

In some embodiments, after transmitting the data frame of the first in first out caching area to the data receiving apparatus, the method further comprises: transmitting the retransmission notification to the primary apparatus in the case of receiving a retransmission notification for a first data frame fed back by the data receiving apparatus, wherein the first data frame is a data frame in the first number of data frames which needs to be retransmitted to the wireless communication apparatus.

In some embodiments, after transmitting the data frame of the first in first out caching area to the data receiving apparatus, the method further comprises: transmitting to the primary apparatus a notification that the first number of data frames are successfully transmitted to the data receiving apparatus when receiving a transmission completion notification fed back by the data receiving apparatus.

In a third aspect, the present application provides a primary apparatus comprising:
  a first transmission unit for transmitting attribute information corresponding to a first number of data frames and number information carrying the first number to the wireless communication apparatus, wherein the first number is not greater than a first threshold value, and the first threshold value is determined through negotiation between the wireless communication apparatus and the data receiving apparatus; and
  a second transmission unit for transmitting the first number of data frames to the wireless communication apparatus for the wireless communication apparatus to perform aggregation processing on the data frames based on the attribute information and the first number carried by the number information.

In a fourth aspect, the present application provides a wireless network communication technology chip, wherein the wireless network communication technology chip comprises:
  an aggregation unit for performing aggregation processing on data frames transmitted by a primary apparatus based on attribute information corresponding to a first number of data frames and carrying the first number of data frames, and storing the aggregated data frames in a first in first out caching area; wherein the attribute information and the number information are provided by the primary apparatus, and the first number is not greater than a first threshold value, and the first threshold value is determined through negotiation between the wireless communication apparatus and the data receiving apparatus; and
  a third transmission unit for transmitting the data frame of the first in first out caching area to the data receiving apparatus.

In a fifth aspect, the present application provides a data transmission system comprising: a primary apparatus of the third aspect and a wireless communication apparatus applying the wireless network communication technology chip of the fourth aspect.

In a sixth aspect, the present application provides a computer readable storage medium comprising a stored program, wherein the program, when executed, controls an apparatus on which the storage medium is located to perform the data transmission method of the first aspect and/or to perform the data transmission method of the second aspect.

The above description is merely an overview of the technical solution of the present application, which can be implemented according to the contents of the description in order to enable the technical means of the present application to be more clearly understood, and in order to enable the above and other objects, features, and advantages of the present application to be more clearly understood, embodiments of the present application are set forth below.

BRIEF DESCRIPTION OF THE DRAWINGS

In order to explain the embodiments of the present application or the technical solutions in the prior art more clearly, the following will briefly introduce the drawings which need to be used in the embodiments or the description of the prior art; obviously, the drawings in the following description are some embodiments of the present application, and it would have been obvious for a person of ordinary skill in the art to obtain other drawings according to these drawings without involving any inventive effort.

FIG. 3 shows a second flowchart of a data transmission method according to an embodiment of the present application;

FIG. 4 shows one of structural schematics of a primary apparatus according to an embodiment of the present application;

DETAILED DESCRIPTION OF THE INVENTION

Figure 1:
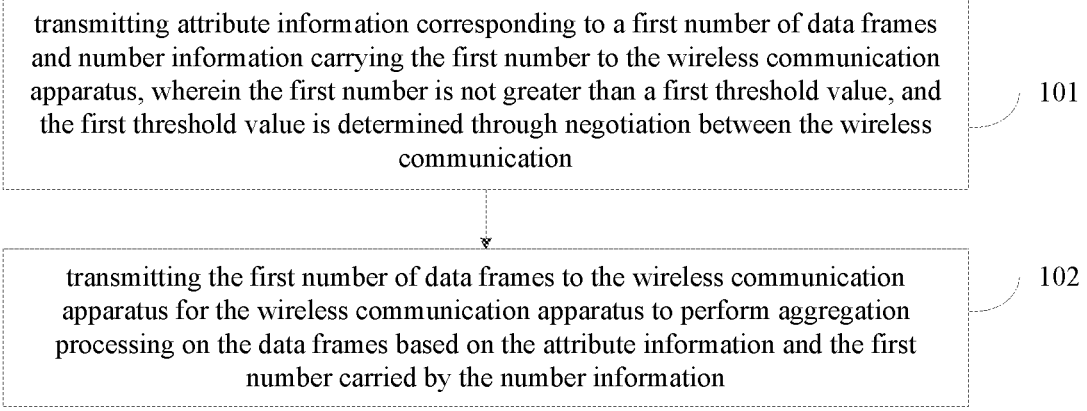
FIG. 1 shows one of the flowcharts of a data transmission method according to an embodiment of the present application.

Exemplary embodiments of the present disclosure will be described in more detail below with reference to the accompanying drawings. While the drawings show exemplary embodiments of the present disclosure, the present disclosure may be embodied in various forms and should not be construed as limited to the embodiments set forth herein. Rather, these embodiments are provided so that this disclosure will be thorough and complete, and will fully convey the scope of the disclosure to a person skilled in the art.

In a wireless local area network, a primary apparatus communicates with a wireless communication apparatus over a bus. The primary apparatus is configured to generate and transmit data frames to the wireless communication apparatus over the bus. The WiFi chip operates in a wireless communication apparatus for providing a data path through which data frames provided by a primary apparatus are transmitted to a data receiving apparatus.

The specific types of primary apparatus, wireless communication apparatus, and data receiving apparatus described above are not limiting of the embodiments of the present application as they relate to specific application scenarios. Illustratively, in an Internet of Things camera scenario, the primary apparatus is a camera, the wireless communication apparatus is a wireless network card, and the data receiving apparatus is a router. In addition, the specific configuration of the primary apparatus, the wireless communication apparatus and the data receiving apparatus is not specifically limited by the embodiments of the present application and may be selected based on service requirements. The primary apparatus is a device provided with an embedded chip or cpu, wherein the cpu can be an arm running linux, and the embedded chip is a risc-v embedded chip. The primary apparatus runs wpa/cfg80211. The 80211 mac is provided in the wireless communication apparatus. The bus between the primary apparatus and the wireless communication apparatus may be selected from any of the following: sdio bus, usb bus, and spi bus.

In order to improve the throughput, an A-MPDU transmission is adopted in an IEEE 802.11 standard, i.e., after a wireless communication apparatus encapsulates a data frame provided by a primary apparatus into an MPDU and aggregates a plurality of MPDU into one A-MPDU, the aggregated A-MPDU is transmitted to a data receiving apparatus.

At present, the aggregation number of data frames is typically determined by the wireless communication apparatus. The wireless communication apparatus aggregates the received data frames into one A-MPDU if it receives the number of data frames transmitted by the primary apparatus up to the determined aggregation number. The way the wireless communication apparatus determines that the aggregation number has the following two defects: first, a wireless communication apparatus has a limited storage space, and the determined aggregation number depends on the storage space. Since the aggregation number of data frames is directly related to throughput, throughput is severely limited based on the aggregation number depending on the storage space of the wireless communication apparatus. Secondly, when the number of data frames received by the wireless communication apparatus reaches the aggregation number, the wireless communication apparatus aggregates the data frames, so that a large amount of storage space is required in the wireless communication apparatus to store the data frames. As can be seen by the above drawbacks, the way the wireless communication apparatus determines the aggregation number results in data transmissions that are heavily dependent on the storage space of the wireless communication apparatus.

In order to overcome the above defects, the embodiments of the present application provide a data transmission method, a primary apparatus, and a wireless network communication technology chip. According to the data transmission method, primary apparatus and wireless network communication technology chip provided in the embodiments of the present application, the aggregation number is no longer determined by the wireless communication apparatus, but is determined by the primary apparatus. The wireless communication apparatus docs not need to wait for the aggregation number of data frames to be stored in the storage space thereof to perform aggregation processing, but performs aggregation processing on the received data frames according to the aggregation number determined by the primary apparatus and the attribute information about the data frames to be transmitted along with the incoming of the data frames, and can store the aggregated data frames in a first in first out caching area, and timely acquire the data frames from the first in first out caching area and output same to the data receiving apparatus. A data transmission method, a primary apparatus, and a wireless network communication technology chip according to an embodiment of the present application are specifically described below.

As shown in FIG. 1, an embodiment of the present application provides a data transmission method applied to a primary apparatus, and the data transmission method mainly comprises the following steps 101 to 102:

101, transmitting attribute information corresponding to a first number of data frames and number information carrying the first number to the wireless communication apparatus, wherein the first number is not greater than a first threshold value, and the first threshold value is determined through negotiation between the wireless communication.

The first number is the aggregation number of data frames, which defines the total number of data frames required to aggregate one A-MPDU. The first number is determined by the primary apparatus, so the primary apparatus needs to determine the first number before step 101. The size of the first number determines the throughput, and the first number may be set larger in order to obtain a larger throughput, but the first number may not be larger than the first threshold value. The first threshold value is negotiated by the wireless communication apparatus and the data receiving apparatus.

The specific process of determining the first number is: determining a total amount of data frames to be transmitted having the same priority; and setting the first number based on the total quantity and the first threshold value.

It can be seen from the specific process of the first number that the determination of the first number is related to the following two factors:

factor one is a first threshold value which is a value negotiated by the wireless communication apparatus and the data receiving apparatus, which is an upper limit value set for the first number. The number of data frames per communication between the wireless communication apparatus and the data receiving apparatus is limited, and communication between the wireless communication apparatus and the data receiving apparatus more than this number may be abnormal, and therefore a maximum number needs to be negotiated between the wireless communication apparatus and the data receiving apparatus, and the negotiated value can be used as a first threshold value.

The process that the wireless communication apparatus and the data receiving apparatus negotiate the first threshold value may be: the wireless communication apparatus acts as an aggregation requester and the data receiving apparatus acts as an aggregation responder. An aggregation requester firstly sends an aggregation request, i.e., "addba req", to request to establish an aggregation path, and the request carries the aggregation number. The aggregation responder replies to the aggregation response "addba response", and the aggregation response specifics whether the aggregation number is successfully negotiated. If it is specified in the aggregation response that the aggregation number is successfully negotiated, then the aggregation path is completely established at this moment, the first threshold value is the aggregation number successfully negotiated, and subsequent data frames can all be transmitted according to the first threshold value. If it is specified in the aggregation response that the aggregation number negotiation is unsuccessful, the aggregation requester modifies the aggregation number and resends the aggregation request to establish an aggregation path, wherein the request carries a new aggregation number. The corresponding processing is performed according to the aggregation response replied by the aggregation responder. This process is repeated until the first threshold value negotiation is successful.

Factor two, the total number of data frames to be transmitted having the same priority. Data frames with different priorities cannot be aggregated into one A-MPDU for transmission. The data frames involved in an A-MPDU should all be of the same priority, and therefore the total amount of data frames to be transmitted of the same priority needs to be counted to determine a first number satisfying the priority according to the total amount and a first threshold value to transmit the data frames of the priority at the most suitable throughput at the first number.

The priority here corresponds to the data type of the data frame. Illustratively, the data frames to be transmitted of the same priority are all corresponding data frames of the type video "i.e. VIDEO".

The determination of the first number is only related to the "total amount of data frames to be transmitted having the same priority" and the "first threshold value", irrespective of the size of the storage space in the wireless communication apparatus. After determining the two factors "total amount of data frames to be transmitted having the same priority" and "first threshold value", a first number may be set based on the total amount and the first threshold value. The principle of setting the first number based on the total quantity and the first threshold value is: the data frames are transmitted with the most suitable throughput at the first number.

A specific method of setting the first number based on the total quantity and the first threshold value comprises: the total amount is set as the first number when the total amount is not greater than the first threshold value. When the total amount is greater than the first threshold value, the data frames to be transmitted with the same priority are split into at least two parts, wherein the number of each data frame to be transmitted is not greater than the first threshold value, and the number of data frames in one part needing to be transmitted currently is determined as the first number.

After the first number is set, a first number of data frames needs to be determined. After determining the first number of data frames, the first number of data frames needs to be cached in a second caching space in the primary apparatus to facilitate management of the first number of data frames. The second caching space is a space for caching data frames.

In order to enable the wireless communication apparatus to know the number of data frames required to aggregate an A-MPDU and which data frames are required to aggregate the A-MPDU, it is necessary to transmit the attribute information corresponding to the first number of data frames and the number information carrying the first number to the wireless communication apparatus. The attribute information comprises a name, a data length, and a priority, i.e., ac information, of each determined data frame. The number information carries a first number to inform the wireless communication apparatus of the number of data frames required to aggregate an A-MPDU.

The specific process of transmitting attribute information corresponding to a first number of data frames and number information carrying the first number to the wireless communication apparatus comprises: transmitting the attribute information and the number information to the wireless communication apparatus based on a priority corresponding to the first number of data frames. The primary apparatus may have data frames with multiple priorities needing to be transmitted to the wireless communication apparatus at the same time, and the transmission order of the data frames with different priorities is different; therefore, it is necessary to determine the transmission order corresponding to the data frames based on the priorities corresponding to the data frames, and to transmit the number information and the attribute information about all the data frames to the wireless communication apparatus according to the determined transmission order.

102, transmitting the first number of data frames to the wireless communication apparatus for the wireless communication apparatus to perform aggregation processing on the data frames based on the attribute information and the first number carried by the number information.

After the number information and the attribute information corresponding to all the data frames are transmitted to the wireless communication apparatus, it is indicated that the wireless communication apparatus has obtained the necessary information required for the aggregation A-MPDU, so that the primary apparatus transmits the first number of data frames to the wireless communication apparatus after transmitting the number information and the attribute information corresponding to all the data frames to the wireless communication apparatus.

The specific process of transmitting the first number of data frames to the wireless communication apparatus comprises the following steps 102A to 102C:

102A, sequentially transmitting the data frames to a data transmission module of the primary apparatus based on a transmission order corresponding to the first number of data frames, wherein the data transmission module comprises a plurality of first caching spaces for caching data frames. The primary apparatus is connected to the wireless communication apparatus through a data transmission module, and data frames are transmitted to the wireless communication apparatus through the data transmission module. The specific type of the data transmission module is not limited in this embodiment. Illustratively, the data transmission module is a USB module.

After the first number of data frames is determined, the determined data frames may not be transmitted to the data transmission module in time, because in order to facilitate the management of the determined data frames, after the first number of data frames is determined, the first number of data frames need to be cached to a second caching space in the primary apparatus, wherein the second caching space is used for caching the data frames, before the data frames are sequentially transmitted to the data transmission module of the primary apparatus based on the transmission order corresponding to the first number of data frames. On the premise of using a second caching space to caching data frames, therefore, based on a transmission order corresponding to a first number of data frames, the specific process of successively transmitting data frames to a data transmission module of a primary apparatus is: reading data frames from a second caching space corresponding to each data frame in turn based on a transmission order corresponding to a first number of data frames, and transmitting same to a data transmission module.

102B, allocating a corresponding first caching space for the data frame, and storing the data frame into the allocated first caching space for each data frame transmitted to the data transmission module; wherein the first caching space allocated for the data frame is a first idle caching space, and the previous first caching space adjacent thereto is currently occupied, and the next first caching space connected thereto is idle at present.

In order to reduce the number of first caching spaces in the data transmission module, the data transmission module may maintain a packet sending table. The packet sending table is used for recording whether each first caching space in the data transmission module is currently in an idle state or an occupied state. When it is determined based on the packet sending table that there is first idle caching space, a data frame is transmitted to the data transmission module. When receiving a data frame, the data transmission module allocates a corresponding first caching space for the data frame, and stores the data frame into the allocated first caching space. By maintaining the packet sending table, not only the number of the first caching space can be reduced, but also the data frame loss caused by insufficient first idle caching space can be avoided.

In order to reduce the data transmission frequency, the data transmission module transmits a data frame stored therein to the wireless communication apparatus only when the transmission condition is satisfied, and therefore the data frame is not transmitted to the wireless communication apparatus immediately after being transmitted to the data transmission module, and therefore a corresponding first caching space needs to be allocated for each data frame transmitted to the data transmission module, and the data frame is stored in the first caching space allocated therefor. In order to avoid loss of a data frame, the data frame is transmitted to the data transmission module only when the data transmission module is idle, and the first caching space allocated for the data frame is in an idle state, and the previous first caching space adjacent thereto is currently occupied, and the next first caching space connected thereto is idle at present.

102C, transmitting the data frame stored in the first caching space to the wireless communication apparatus when a transmission condition is satisfied.

To reduce the data transmission frequency, the data transmission module transmits its stored data frames to the wireless communication apparatus only if transmission conditions are met. There are two methods for the determination method to satisfy the transmission condition: first, when all the first caching space in the data transmission module is occupied, it is indicated that the transmission condition is satisfied. Secondly, when a second number of first caching space that exists continuously in the data transmission module is occupied, it is indicated that the transmission condition is satisfied.

Upon determining that the transmission condition is satisfied, the data frame stored in the first caching space is transmitted to the wireless communication apparatus. The specific process of transmitting the data frame stored in the first caching space to the wireless communication apparatus comprises the following steps 102C1 to 102C3:

102C1, detecting whether a first caching space allocated to each target data frame is a first caching space that exists continuously; if not, executing step 102C2; if so, performing step 102C3.

The target data frame is a data frame transmitted to the data transmission module before satisfying a transmission condition, and the target data frame is a data frame in the first number of data frames. When data frames in the first number of data frames are transmitted to the data transmission module, there may be interference of other data frames, and therefore, in order to avoid transmitting the interference-generated data frames to the wireless communication apparatus together with the data frames in the first number of data frames, it is necessary to detect whether the first caching space allocated to each target data frame is a continuously existing first caching space.

When it is detected that the first caching space allocated to each target data frame is not the first caching space that exists continuously, it is indicated that there is interference of other data frames during the transmission of each target data frame, and thus step 102C2 is carried out.

When it is detected that the first caching space allocated to each target data frame is the first caching space that exists continuously, it is indicated that there is no interference of other data frames during the transmission of each target data frame, and therefore step 102C3 is carried out. 102C2, adjusting the first caching space allocated to each of the target data frames so that each of the target data frames is stored in the continuously existing first caching space.

When it is detected that the first caching space allocated to each target data frame is not the first caching space that exists continuously, it is indicated that there is interference of other data frames during the transmission of each target data frame. In order to exclude interfering data frames, the allocated first caching space of each target data frame is adjusted so that each target data frame is stored in the continuously existing first caching space.

102C3, transmitting the target data frames to the wireless communication apparatus according to the transmission order of the first caching space corresponding to each of the target data frames. Transmitting a target data frame to a wireless communication apparatus requires adding the same message header to the target data frame. The message header is based on a specific transmission protocol between the primary apparatus and the wireless communication apparatus, and the embodiment is not particularly limited. The same message header is added to the target data frame, and the target data frame added with the same message header is added to the wireless communication apparatus according to the transmission order of the first caching space corresponding to each target data frame.

Figure 2:
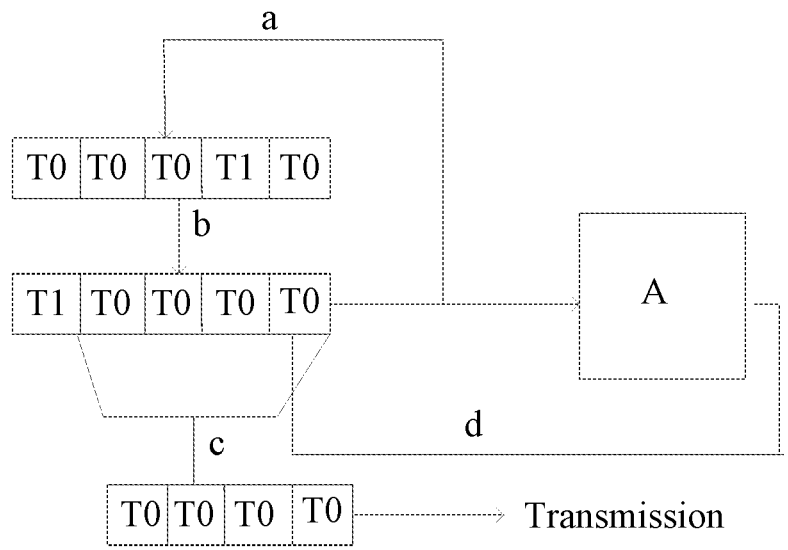
FIG. 2 shows a detailed process diagram for transmitting a first number of data frames to a wireless communication apparatus according to an embodiment of the present application.

The specific process of transmitting the first number of data frames to the wireless communication apparatus described above is illustrated by way of example in FIG. 2:

FIG. 2 shows four data frames T0 of the first number of data frames that have been transmitted to the data transmission module, the four data frames T0 being target data frames. Each data frame T0 is stored in a corresponding first caching space, and the corresponding grid of the data frame T0 in FIG. 2 represents the corresponding first caching space. A line segment a in FIG. 2 represents the process of detecting whether the first caching space to which four data frames T0 are allocated is the first caching space that exists continuously. It is detected that the first caching space to which four data frames T0 are allocated is not the continuously existing first caching space due to the presence of other data frames T1. Therefore, a flow corresponding to the line segment b "adjusting the allocated first caching space of each target data frame" is entered, and after adjustment, four data frames T0 are stored in the continuously existing first caching space. A flow corresponding to a line segment c, "according to the transmission order of the first caching space corresponding to the four data frames T0, transmitting the four data frames T0 added with the same message header to the wireless communication apparatus" is entered.

A in FIG. 2 is a packet sending table maintained by a data transmission module. When four data frames T0 are transmitted to the wireless communication apparatus, the first caching space corresponding to the four data frames T0 is released. When the first caching space which is idle is recorded in the packet sending table, the data frame is transmitted to the data transmission module, the corresponding first caching space is allocated for the data frame, and the data frame is stored in the first caching space allocated for the data frame. Line segment d in FIG. 2 is the process of storing a newly transmitted data frame to the released first caching space. Further, in the above-mentioned step 102, after transmitting the first number of data frames to the wireless communication apparatus, the data transmission method applied to the primary apparatus further comprises the following steps: performing retransmission processing on the first data frame after the first number of data frames are all transmitted to the wireless communication apparatus in the case where the wireless communication apparatus feeds back a retransmission notification for a first data frame, wherein the first data frame is a data frame in the first number of data frames which needs to be retransmitted to the wireless communication apparatus.

After the wireless communication apparatus sends a data frame to the data receiving apparatus, if the data receiving apparatus successfully receives the data frame, it will feed back a response of successful reception to the wireless communication apparatus. A data frame that the wireless communication apparatus has not received the response successfully, i.e. a data frame that has not been successfully transmitted to the data receiving apparatus, is defined as a first data frame. Since the wireless communication apparatus transmits the data frame to the data receiving apparatus through the first in first out caching area, the data frame does not exist in the first in first out caching area after being transmitted to the data receiving apparatus, so that the wireless communication apparatus needs to feed back a retransmission notification for the first data frame to the primary apparatus so that the primary apparatus retransmits the first data frame to the wireless communication apparatus according to the retransmission for the wireless communication apparatus to retransmit the first data frame to the data receiving apparatus.

There are two methods for performing retransmission processing on a first data frame:

Firstly, transmitting attribute information about all the first data frames and total amount information carrying the total amount of the first data frames to the wireless communication apparatus; and transmitting the first data frame to the wireless communication apparatus for the wireless communication apparatus to aggregate the first data frame based on the first number and the total amount information.

Since the first data frame is a data frame needing to be retransmitted in a first number of data frames, the number of the first number of frames thereof must not be more than the first number, the total amount information carrying the total amount of the first data frames and the attribute information about all the first data frames is transmitted to the wireless communication apparatus. After transmitting the total amount information and the attribute information about the first data frame, the first data frame is transmitted to the wireless communication apparatus for the wireless communication apparatus to perform aggregation processing on the first data frame based on the total amount information and the attribute information, and transmitted to the data receiving apparatus after the aggregation processing.

Secondly, taking both the data frame to be transmitted with the same priority as the first data frame and the first data frame as a data frame to be selected when there is also a data frame to be transmitted with the same priority as the first data frame; and determining a first number of data frames from the data frames to be selected.

In order to make full use of the channel between the wireless communication data and the data receiving apparatus, when there is a data frame to be transmitted with the same priority as the first data frame, both the data frame to be transmitted with the same priority as the first data frame and the first data frame are taken as a data frame to be selected, and a first number of data frames are determined from the data frame to be selected. The number information carrying a first number and attribute information corresponding to the determined first number of data frames are transmitted to a wireless communication apparatus for the wireless communication apparatus to perform aggregation processing on the data frames based on the number information and the attribute information.

Further, due to the limited number of second caching space in the primary apparatus for storing data frames, the second caching space needs to be released in time to store new data frames to be transmitted to the wireless communication apparatus. Therefore, after transmitting the first number of data frames to the wireless communication apparatus at the above step 102, the data transmission method applied to the primary apparatus further comprises a scheme of releasing the second caching space. There are two schemes for releasing the second caching space:

first, counting the total number of data frames that have been transmitted to the wireless communication apparatus every time after transmitting one data frame to the wireless communication apparatus; and releasing a second caching space corresponding to the data frame when the total amount reaches a second threshold value.

Every time a data frame is transmitted to the wireless communication apparatus, the total number of data frames that have been transmitted to the wireless communication apparatus is counted. When the total amount reaches the second threshold value, it is indicated that the data frame has been successfully transmitted to the data receiving apparatus with a high probability, and thus the second caching space corresponding to the data frame is released. When the total amount does not reach the second threshold value, it is indicated that the data frame may also be unsuccessfully transmitted to the data receiving apparatus; and in order to be able to call the data frame when retransmission of the data frame occurs, the second caching space corresponding to the data frame is not released, so that the data frame continues to be stored in the second caching space corresponding thereto.

The size of the second threshold value may be determined based on service requirements, and the embodiment is not particularly limited. Illustratively, the second threshold value is 64.

Secondly, releasing a second caching space corresponding to the data frame when the duration of transmission of the data frame to the wireless communication apparatus reaches a target duration every time after transmitting one data frame to the wireless communication apparatus.

The length of time that the statistical data frame is transmitted to the wireless communication apparatus after each data frame is transmitted to the wireless communication apparatus. When the statistical duration reaches the target duration, it is indicated that the data frame has been successfully transmitted to the data receiving apparatus with a high probability, and thus the second caching space corresponding to the data frame is released. When the statistical duration does not reach the target duration, it is indicated that the data frame may also be unsuccessfully transmitted to the data receiving apparatus; and in order to be able to call the data frame when retransmission of the data frame occurs, the second caching space corresponding to the data frame is not released, so that the data frame continues to be stored in the second caching space corresponding thereto.

The size of the target duration may be determined based on service requirements, and the embodiment is not particularly limited. Illustratively, the target duration is 1 second.

In a data transmission method according to an embodiment of the present application, when data frame transmission is required, a primary apparatus first transmits attribute information corresponding to a first number of data frames and number information carrying the first number to a wireless communication apparatus. The first number of data frames is then transmitted to the wireless communication apparatus for the wireless communication apparatus to aggregate the data frames based on the first number carried by the attribute information and the number information. The first number of data frames required of the present application, the first number of data frames required for aggregating one A-MPDU is determined by the primary apparatus, and the setting of the first number is only related to the first threshold value negotiated by the wireless communication apparatus and the data receiving apparatus, and is independent of the size of the storage space in the wireless communication apparatus. In addition, after transmitting to the wireless communication apparatus the number information carrying the first number and the attribute information corresponding to all the data frames, the wireless communication apparatus has obtained the necessary information required for the aggregation A-MPDU, so that the primary apparatus transmits to the wireless communication apparatus the first number of data frames after transmitting the number information and the attribute information corresponding to all the data frames, so that the wireless communication apparatus performs aggregation processing on the data frames based on the number information and the attribute information. The solution provided by the embodiments of the present application can not only flexibly set the first number based on data transmission requirements, but also can reduce the dependence of data transmission on the size of the storage space of the wireless communication apparatus.

As shown in FIG. 3, an embodiment of the present application provides a data transmission method applied to a wireless network communication technology chip of a wireless communication apparatus, and the data transmission method mainly comprises the following steps:

201, performing aggregation processing on data frames transmitted by a primary apparatus based on attribute information corresponding to a first number of data frames and carrying the first number of data frames, and storing the aggregated data frames in a first in first out caching area; wherein the attribute information and the number information are provided by the primary apparatus, and the first number is not greater than a first threshold value, and the first threshold value is determined through negotiation between the wireless communication apparatus and the data receiving apparatus.

In order to enable the wireless network communication technology chip to know the number of data frames required to aggregate an A-MPDU and which data frames are required to aggregate the A-MPDU, the wireless communication apparatus receives the data frames transmitted by the primary apparatus carrying the first number of number information and the attribute information corresponding to the first number of data frames.

The first number is the aggregation number of data frames, which defines the total number of data frames required to aggregate one A-MPDU. The first number may be flexibly determined by the primary apparatus according to its own data transmission requirements, limited only by the first threshold value, irrespective of the size of the storage space in the wireless communication apparatus. The first number is not greater than a first threshold value, and the first threshold value is a value negotiated by the wireless communication apparatus and the data receiving apparatus, which is an upper limit value set for the first number. The process by which the wireless communication apparatus and the data receiving apparatus negotiate the first threshold value is described in detail in step 101 above.

The attribute information is used to inform the wireless network communication technology chip which data frames are needed for aggregating an A-MPDU. The attribute information comprises a name, a data length, and a priority, i.e., ac information, of each data frame in the first number of data frames.

After acquiring the number information and the attribute information corresponding to the first number of data frames, the wireless communication apparatus indicates that the wireless network communication technology chip has acquired the necessary information required for aggregation A-MPDU; therefore, when the primary apparatus transmits data frames to the wireless communication apparatus, the wireless network communication technology chip performs aggregation processing on the data frames transmitted by the primary apparatus based on the attribute information and the first number carried by the number information.

The specific process of performing aggregation processing on data frames transmitted by a primary apparatus based on attribute information corresponding to a first number of data frames and carrying the first number of data frames comprises detecting whether the data frames are received completely based on the data length in the corresponding attribute information every time receiving one of the data frames; if so, adding a physical layer message header to the data frame to obtain an aggregated processed data frame, wherein the physical layer message header is used for aggregating the first number of data frames.

Every time a data frame is received, whether it is a data frame in the first number of data frames is determined according to a data frame name in the received attribute information. If so, it is indicated that the data frame needs to be aggregated. Detection of whether the reception of the data frame is completed based on the data length carried by the corresponding attribute information is continued. When it is determined that the reception of the data frame is completed based on the data length carried in the corresponding attribute information, a physical layer message header is added to the data frame to obtain an aggregated processed data frame. The physical layer message header is used to aggregate a first number of data frames, which can identify in which A-MPDU the data frames are aggregated.

The first number defines the total number of data frames required for aggregating an A-MPDU, and in order to ensure that the number in the A-MPDU is the first number, after adding a physical layer message header to the data frame to obtain an aggregated processed data frame, whether the total amount of the currently received data frames reaches the first number is determined; if so, the aggregation process for the first number of data frames is determined to end. If not, it is indicated that the aggregation process for the first number of data frames has not ended, and that the data frames are not aggregated, so that the data frames transmitted by the primary apparatus continue to be received.

Since the wireless communication apparatus transmits the aggregated data frame to the data receiving apparatus at a certain transmission rate, the aggregated processed data frame may not be transmitted in time, and thus after obtaining the aggregated processed data frame, the aggregated processed data frame needs to be stored in the first in first out caching area.

An object of the first in first out caching area setting is to minimize the caching space required in the wireless communication apparatus to store data frames that are not transmitted to the data receiving apparatus in a timely manner. The size of the storage space of the first in first out caching area is only sufficient to be able to store data frames which are not transmitted to the data receiving apparatus in time.

The specific process of storing the aggregated processed data frames into a first in first out caching area comprises: allocating a corresponding caching space for the aggregated processed data frame in the first in first out caching area, and caching the aggregated processed data frame to the caching space allocated thereto; wherein the caching space allocated for the data frame is an idle caching space, and the previous caching space adjacent thereto is currently occupied.

When the aggregation-processed data frame is stored in a first in first out caching area, firstly a corresponding caching space for the aggregation-processed data frame is allocated in the first in first out caching area. The specific process of allocating a corresponding caching space for an aggregated processed data frame in a first in first out caching area is: selecting a first in first out caching area, wherein the priority of the selected first in first out caching area is the same as the priority carried by the attribute information. A corresponding caching space for the aggregated processed data frame is allocated in the selected first in first out caching area. The first in first out caching areas corresponding to different priorities are different, and therefore a first in first out caching area with the same priority as that carried by the attribute information needs to be selected.

In order to ensure that a data frame in a first in first out caching area can be first-in-first-out, a caching space allocated for a data frame after aggregation processing is an idle caching space, and a previous caching space adjacent thereto is currently occupied.

202, transmitting a data frame of the first in first out caching area to the data receiving apparatus. The specific process of transmitting a data frame of a first in first out caching area to a data receiving apparatus is: acquiring data from a first in first out caching area and outputting same to a data receiving apparatus according to a receiving order of data frames.

When the wireless communication apparatus performs the first number of data frames, the wireless network communication technology chip does not need to wait for the first number of data frames to be stored in its storage space before performing aggregation processing, but performs aggregation processing on the received data frames according to the first number and attribute information carried in the number information transmitted by the primary apparatus along with the incoming of the data frames, and can store the aggregated data frames in a first in first out caching area, and timely acquire data from the first in first out caching area and output same to the data receiving apparatus.

Further, after the above-mentioned step 202 transmits the data frame of the first in first out caching area to the data receiving apparatus, the data transmission method applied to the wireless network communication technology chip of the wireless communication apparatus further comprises the following steps: transmitting the retransmission notification to the primary apparatus in the case of receiving a retransmission notification for a first data frame fed back by the data receiving apparatus, wherein the first data frame is a data frame in the first number of data frames which needs to be retransmitted to the wireless communication apparatus.

After the wireless communication apparatus sends a data frame to the data receiving apparatus, if the data receiving apparatus successfully receives the data frame, it will feed back a response of successful reception to the wireless communication apparatus. A data frame that the wireless communication apparatus has not received the response successfully, i.e. a data frame that has not been successfully transmitted to the data receiving apparatus, is defined as a first data frame. Since the wireless communication apparatus transmits the data frame to the data receiving apparatus through the first in first out caching area, the data frame does not exist in the first in first out caching area after being transmitted to the data receiving apparatus, so that the wireless communication apparatus needs to feed back a retransmission notification for the first data frame to the primary apparatus so that the primary apparatus retransmits the first data frame to the wireless communication apparatus according to the retransmission for the wireless communication apparatus to retransmit the first data frame to the data receiving apparatus.

The retransmission notification carries the name of the first data frame for the primary apparatus to determine the first data frame which needs to be retransmitted.

Further, after the above-mentioned step 202 transmits the data frame of the first in first out caching area to the data receiving apparatus, the data transmission method applied to the wireless network communication technology chip of the wireless communication apparatus further comprises the following steps: upon receiving the notification of the completion of transmission fed back by the data reception apparatus, a notification is transmitted to the primary apparatus that the first number of data frames are successfully transmitted to the data reception apparatus.

When receiving the notification of the completion of transmission fed back by the data receiving apparatus, it is stated that the first number of data frames transmitted to the primary apparatus are all successfully transmitted to the data receiving apparatus, and in order to make the primary apparatus know this situation, the notification of the first number of data frames transmitted to the data receiving apparatus are transmitted to the primary apparatus.

According to the data transmission method provided by an embodiment of the present application, when data frame transmission is needed, firstly, the data frames transmitted by primary apparatus carrying a first number of number information and attribute information corresponding to the first number of data frames are wirelessly received. Then aggregation processing is performed on the data frames transmitted by the primary apparatus based on the first number and the attribute information, and the aggregated data frames are stored in a first in first out caching area. Finally, the data frame of the first in first out caching area is transmitted to the data receiving apparatus.

According to the solution provided by the embodiments of the present application, the first number of data frames required to aggregate one A-MPDU is determined by the primary apparatus, and the wireless network communication technology chip in the wireless communication apparatus performs aggregation processing according to the first number determined by the primary apparatus. In addition, since the wireless communication apparatus transmits the aggregated data frame to the data receiving apparatus at a certain transmission rate, the aggregated processed data frame may not be transmitted in time, and thus after obtaining the aggregated processed data frame, the aggregated processed data frame is stored in the first in first out caching area. The existence of the first in first out caching area enables the wireless network communication technology chip in the wireless communication apparatus to perform aggregation processing without waiting for the first number of data frames to be stored in the storage space thereof, but performing aggregation processing on the received data frames according to the first number and attribute information transmitted by the primary apparatus along with the incoming of the data frames, and being able to store the aggregated data frames in the first in first out caching area, and timely obtaining data from the first in first out caching area and outputting same to the data receiving apparatus. Therefore, the setting of the first in first out caching area can reduce the size of the storage space in the wireless communication apparatus, thus can reduce the cost of the wireless communication apparatus and improve the market competitiveness of the wireless communication apparatus.

Further, according to the above-mentioned embodiment of a data transmission method applied to a primary apparatus, another embodiment of the present application also provides a primary apparatus, as shown in FIG. 4, the primary apparatus comprises:

a first transmission unit 31 for transmitting attribute information corresponding to a first number of data frames and number information carrying the first number to the wireless communication apparatus, wherein the first number is not greater than a first threshold value, and the first threshold value is determined through negotiation between the wireless communication apparatus and the data receiving apparatus; and a second transmission unit 32 for transmitting the first number of data frames to the wireless communication apparatus for the wireless communication apparatus to perform aggregation processing on the data frames based on the attribute information and the first number carried by the number information.

In the primary apparatus provided in the embodiments of the present application, when data frame transmission is required, a primary apparatus first transmits attribute information corresponding to a first number of data frames and number information carrying the first number to a wireless communication apparatus. The first number of data frames is then transmitted to the wireless communication apparatus for the wireless communication apparatus to aggregate the data frames based on the first number carried by the attribute information and the number information. The first number of data frames required of the present application, the first number of data frames required for aggregating one A-MPDU is determined by the primary apparatus, and the setting of the first number is only related to the first threshold value negotiated by the wireless communication apparatus and the data receiving apparatus, and is independent of the size of the storage space in the wireless communication apparatus. In addition, after transmitting to the wireless communication apparatus the number information carrying the first number and the attribute information corresponding to all the data frames, the wireless communication apparatus has obtained the necessary information required for the aggregation A-MPDU, so that the primary apparatus transmits to the wireless communication apparatus the first number of data frames after transmitting the number information and the attribute information corresponding to all the data frames, so that the wireless communication apparatus performs aggregation processing on the data frames based on the number information and the attribute information. The solution provided by the embodiments of the present application can not only flexibly set the first number based on data transmission requirements, but also can reduce the dependence of data transmission on the size of the storage space of the wireless communication apparatus.

Figure 5:
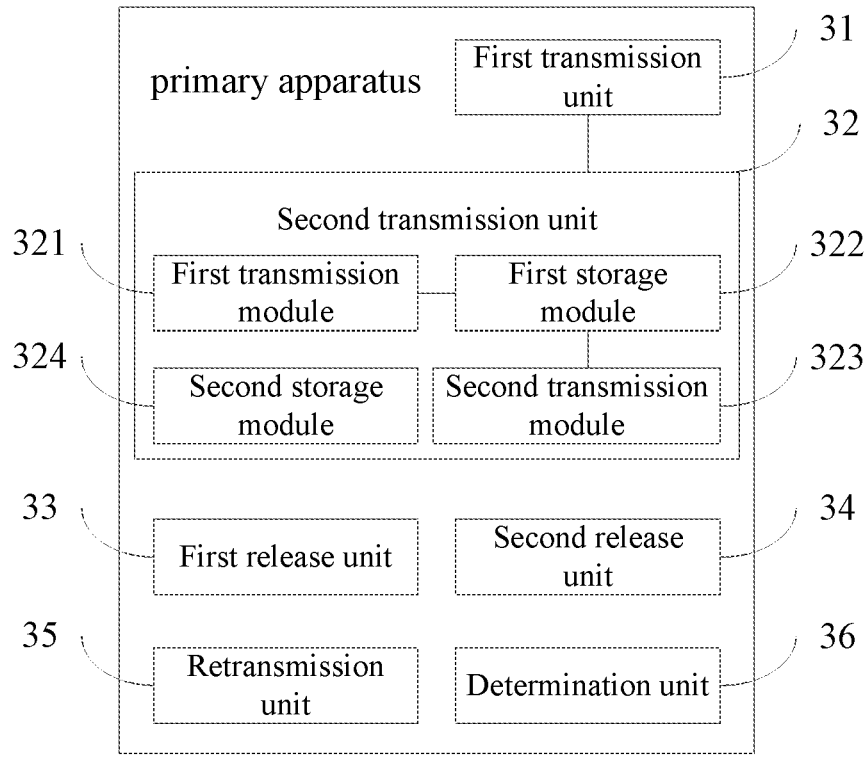
FIG. 5 shows a second structural diagram of a primary apparatus according to an embodiment of the present application.

Alternatively, as shown in FIG. 5, the second transmission unit 32 includes:

a first transmission module 321 for sequentially transmitting the data frames to a data transmission module of the primary apparatus based on a transmission order corresponding to the first number of data frames, wherein the data transmission module comprises a plurality of first caching spaces for caching data frames;

a first storage module 322 for allocating a corresponding first caching space for the data frame, and storing the data frame into the allocated first caching space for each data frame transmitted to the data transmission module; wherein the first caching space allocated for the data frame is a first idle caching space, and the previous first caching space adjacent thereto is currently occupied, and the next first caching space connected thereto is idle at present; and a second transmission module 323 for transmitting the data frame stored in the first caching space to the wireless communication apparatus when a transmission condition is satisfied.

Alternatively, as shown in FIG. 5, a second transmission module 323 is specifically used for detecting whether the first caching space allocated to each target data frame is a first caching space that exists continuously, wherein the target data frame is a data frame transmitted to the data transmission module before the transmission condition is satisfied, and the target data frame is a data frame in a first number of data frames; if not, adjusting the allocated first caching space of each target data frame so that each target data frame is stored in the continuously existing first caching space; transmitting the target data frames added with the same message header to the wireless communication apparatus according to the transmission order of the first caching space corresponding to each target data frame.

Alternatively, as shown in FIG. 5, the second transmission unit 32 includes:

a second storage module 324 for caching the first number of data frames to a second caching space in the primary apparatus before sequentially transmitting the data frames to the data transmission module of the primary apparatus based on the transmission order corresponding to the first number of data frames, wherein the second caching space is used for caching the data frames; reading data frames from a second caching space corresponding to each data frame in turn based on a transmission order corresponding to a first number of data frames, and transmitting same to a data transmission module.

Alternatively, as shown in FIG. 5, the primary apparatus further comprises:

a first release unit 33 for counting the total number of data frames that have been transmitted to the wireless communication apparatus every time after transmitting by the second transmission unit 32 one data frame to the wireless communication apparatus; and releasing a second caching space corresponding to the data frame when the total amount reaches a second threshold value.

Alternatively, as shown in FIG. 5, the primary apparatus further comprises:

a second release unit 34 for releasing a second caching space corresponding to the data frame when the duration of transmission of the data frame to the wireless communication apparatus reaches a target duration every time after transmitting by the second transmission unit 32 one data frame to the wireless communication apparatus.

Alternatively, as shown in FIG. 5, the second transmission unit 32 is specifically adapted to transmit the attribute information and the number information to the wireless communication apparatus based on the priority corresponding to the first number of data frames.

Alternatively, as shown in FIG. 5, the primary apparatus further comprises:

a retransmission unit 35 for performing retransmission processing on the first data frame after the first number of data frames are all transmitted to the wireless communication apparatus in the case where the wireless communication apparatus feeds back a retransmission notification for the first data frame, wherein the first data frame is a data frame in the first number of data frames which needs to be retransmitted to the wireless communication apparatus.

Alternatively, as shown in FIG. 5, a retransmission unit 35 is specifically used for transmitting attribute information about all the first data frames and total amount information carrying the total amount of the first data frames to the wireless communication apparatus; and transmitting the first data frame to the wireless communication apparatus for the wireless communication apparatus to aggregate the first data frame based on the first number and the total amount information.

Alternatively, as shown in FIG. 5, a retransmission unit 35 is specifically used for taking both the data frame to be transmitted with the same priority as the first data frame and the first data frame as a data frame to be selected when there is also a data frame to be transmitted with the same priority as the first data frame; and determining a first number of data frames from the data frames to be selected.

Alternatively, as shown in FIG. 5, the primary apparatus further comprises:

a determination unit 36 for determining the total amount of data frames to be transmitted with the same priority level before the selection unit 31 selects the first number of data frames; and setting the first number based on the total quantity and the first threshold value.

A detailed description of the method used during the operation of each functional module in the primary apparatus provided in the embodiments of the present application can be seen from the detailed description of the corresponding method in the above-mentioned embodiments of the data transmission method applied to the primary apparatus, and will not be repeated here.

Figure 6:
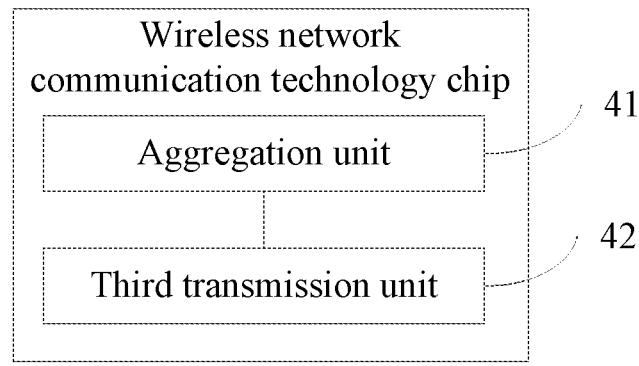
FIG. 6 shows one of the schematic structural diagrams of a wireless network communication technology chip according to an embodiment of the present application.

Further, according to the above-mentioned embodiment of a data transmission method applied to a wireless communication apparatus, another embodiment of the present application also provides a wireless network communication technology chip, as shown in FIG. 6, the wireless network communication technology chip comprises:

an aggregation unit 41 for performing aggregation processing on data frames transmitted by a primary apparatus based on attribute information corresponding to a first number of data frames and carrying the first number of data frames, and storing the aggregated data frames in a first in first out caching area; wherein the attribute information and the number information are provided by the primary apparatus, and the first number is not greater than a first threshold value, and the first threshold value is determined through negotiation between the wireless communication apparatus and the data receiving apparatus; and a third transmission unit 42 for transmitting the data frame of the first in first out caching area to the data receiving apparatus.

According to a wireless network communication technology chip provided by an embodiment of the present application, when data frame transmission is needed, firstly, the data frames transmitted by primary apparatus carrying a first number of number information and attribute information corresponding to the first number of data frames are wirelessly received. Then aggregation processing is performed on the data frames transmitted by the primary apparatus based on the first number and the attribute information, and the aggregated data frames are stored in a first in first out caching area. Finally, the data frame of the first in first out caching area is transmitted to the data receiving apparatus. According to the solution provided by the embodiments of the present application, the first number of data frames required to aggregate one A-MPDU is determined by the primary apparatus, and the wireless network communication technology chip in the wireless communication apparatus performs aggregation processing according to the first number determined by the primary apparatus. In addition, since the wireless communication apparatus transmits the aggregated data frame to the data receiving apparatus at a certain transmission rate, the aggregated processed data frame may not be transmitted in time, and thus after obtaining the aggregated processed data frame, the aggregated processed data frame is stored in the first in first out caching area. The existence of the first in first out caching area enables the wireless network communication technology chip in the wireless communication apparatus to perform aggregation processing without waiting for the first number of data frames to be stored in the storage space thereof, but performing aggregation processing on the received data frames according to the first number and attribute information transmitted by the primary apparatus along with the incoming of the data frames, and being able to store the aggregated data frames in the first in first out caching area, and timely obtaining data from the first in first out caching area and outputting same to the data receiving apparatus. Therefore, the setting of the first in first out caching area can reduce the size of the storage space in the wireless communication apparatus, thus can reduce the cost of the wireless communication apparatus and improve the market competitiveness of the wireless communication apparatus.

Figure 7:
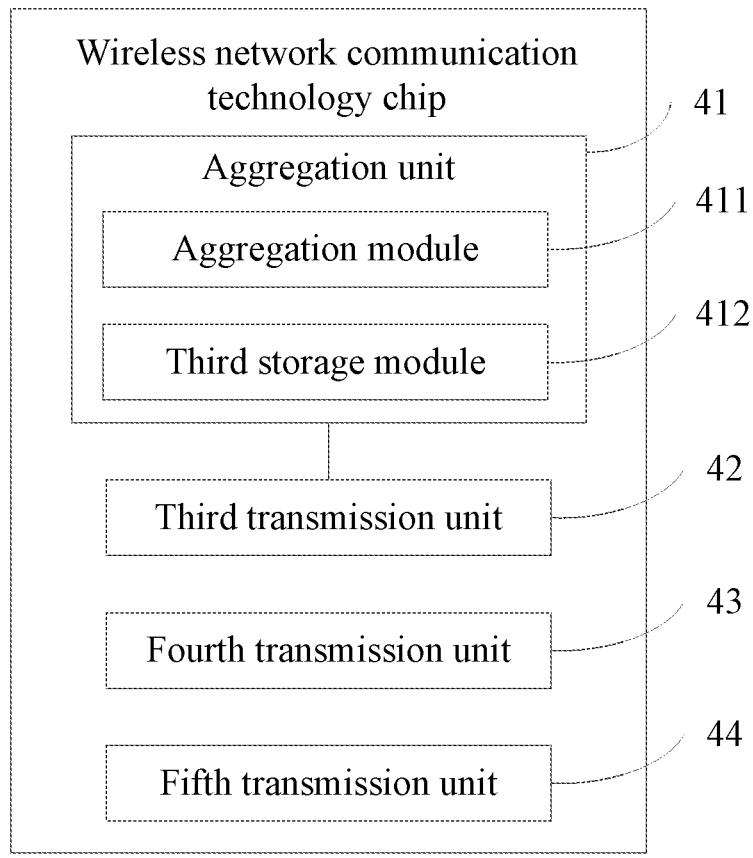
FIG. 7 shows a second structural diagram of a wireless network communication technology chip according to an embodiment of the present application.

Alternatively, as shown in FIG. 7, the aggregation unit 41 comprises:
an aggregation module 411 for detecting whether the data frames are received completely based on the data length in the corresponding attribute information every time receiving one of the data frames; if so, adding a physical layer message header to the data frame to obtain an aggregated processed data frame, wherein the physical layer message header is used for aggregating the first number of data frames.

Alternatively, as shown in FIG. 7, an aggregation module 411 is further used for determining whether the total amount of the currently received data frames reaches the first number; if so, it is determined that the aggregation process for the first number of data frames ends.

Alternatively, as shown in FIG. 7, the aggregation unit 41 comprises:
a third storage module 412 for allocating a corresponding caching space for the aggregated processed data frame in the first in first out caching area, and caching the aggregated processed data frame to the caching space allocated thereto; wherein the caching space allocated for the data frame is an idle caching space, and the previous caching space adjacent thereto is currently occupied.

Alternatively, as shown in FIG. 7, a third storage module 412 is specifically used for selecting a first in first out caching area, wherein the priority of the selected first in first out caching area is the same as the priority carried by the attribute information; in the selected first in first out caching area, a corresponding caching space is allocated for the aggregated processed data frames.

Alternatively, as shown in FIG. 7, the wireless network communication technology chip further comprises:
a fourth transmission unit 43 for transmitting the retransmission notification to the primary apparatus in the case of receiving a retransmission notification for a first data frame fed back by the data receiving apparatus, wherein the first data frame is a data frame in the first number of data frames which needs to be retransmitted to the wireless communication apparatus.

Alternatively, as shown in FIG. 7, the wireless communication apparatus further comprises:
a fifth transmission unit 44 for transmitting to the primary apparatus a notification that the first number of data frames are successfully transmitted to the data receiving apparatus when receiving a transmission completion notification fed back by the data receiving apparatus.

In the wireless network communication technology chip provided by the embodiments of the present application, the detailed description of the method used during the operation of each functional module can be seen from the detailed description of the corresponding method of the above-mentioned embodiment of the data transmission method applied to a wireless communication apparatus, which will not be described in detail herein.

Figure 8:
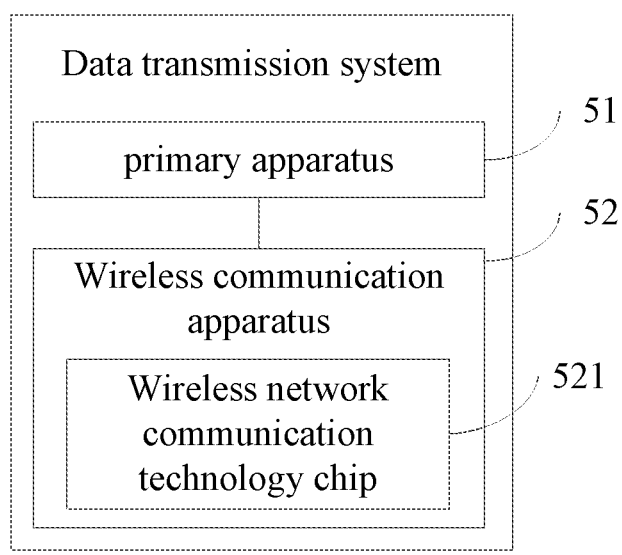
FIG. 8 shows a schematic diagram of a data transmission system according to an embodiment of the present application.

Further, according to the above-mentioned embodiments, another embodiment of the present application also provides a data transmission system, as shown in FIG. 8, comprising: the primary apparatus 51 described above and the wireless communication apparatus 52 employing the wireless network communication technology chip 521 described above.

The advantages of the data transmission system provided by the embodiments of the present application can be seen from the above-mentioned corresponding advantages of the embodiments of the primary apparatus and the wireless communication apparatus.

Further, according to the above-mentioned embodiments, another embodiment of the present application also provides a computer readable storage medium comprising a stored program, wherein when the program is run, a device where the storage medium is controlled to perform the above-mentioned data transmission method applied to a primary apparatus and/or the above-mentioned data transmission method applied to a wireless network communication technology chip is controlled.

Advantageous effects of the computer readable storage medium provided by the embodiments of the present application can be described in detail in the data transmission method applied to the primary apparatus, and/or corresponding advantageous effects of the embodiments of the data transmission method applied to the wireless communication apparatus described above are performed.

In the above-mentioned embodiments, the description of each embodiment has its own emphasis, and reference can be made to the description of described in detail can be referred to the description of other embodiments.

It will be understood that relative features of the methods and devices described above may be referred to one another. In addition, the terms "first", "second", and the like in the above-mentioned embodiments are used to distinguish the various embodiments and do not represent the advantages or disadvantages of the various embodiments.

It will be clear to a person skilled in the art that, for the convenience and brevity of the description, specific working procedures of the above-described systems, devices and units may be referred to corresponding procedures in the preceding method embodiments and will not be described in detail here.

The algorithms and displays presented herein are not inherently related to any particular computer, virtual system, or other apparatus. Various general-purpose systems may also be used with the teachings based herein. The structure required to construct such a system is apparent from the above description. Further, this application is not directed to any particular programming language. the subject matter described herein may be implemented using a variety of programming languages and that the description above of specific languages is for an object of disclosing the best mode of practicing the subject matter.

In the description provided herein, numerous specific details are set forth. However, it is understood that embodiments of the present application may be practiced without these specific details. In some instances, well-known methods, structures, and techniques have not been shown in detail in order not to obscure the understanding of this description.

Moreover, a person skilled in the art will appreciate that although some embodiments described herein include some but not other features included in other embodiments, combinations of features of different embodiments are meant to be within the scope of the application and form different embodiments. For example, in the following claims, any one of the claimed embodiments may be used in any combination.

Various component embodiments of the present application may be implemented in hardware, or in a software module running on one or more processors, or in a combination thereof. A person skilled in the art will appreciate that a microprocessor or digital signal processor (DSP) may be used in practice to implement some or all the functions of some or all the components of the data transmission method according to embodiments of the present application. The application can also be implemented as an apparatus or device program (e.g., a computer program and a computer program product) for performing some or all the methods described herein. Such a program implementing the present application may be stored on a computer-readable medium, or may be in the form of one or more signals. Such signals may be downloaded from an Internet website, provided on a carrier signal, or provided in any other form.

It should be noted that the above-mentioned embodiments illustrate rather than limit the application, and that a person skilled in the art will be able to design alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The application can be implemented by means of hardware comprising several distinct elements, and by means of a suitably programmed computer. In the unit claims enumerating several devices, several of these devices can be embodied by one and the same item of hardware. The use of the words first, second, third, etc. does not denote any order. These words may be interpreted as names.

The invention claimed is:

1. A data transmission method applied to a primary apparatus, comprising:
   acquiring a first threshold negotiated between a wireless communication device and a data receiving device;
   determining a first quantity, wherein the first quantity is not greater than the first threshold;
   transmitting attribute information corresponding to a first number of data frames and number information carrying the first number to the wireless communication apparatus, wherein the attribute information and the number information are used for performing aggregation processing on the first number of data frames; and
   transmitting the first number of data frames to the wireless communication apparatus,
   wherein the transmitting the first number of data frames to the wireless communication apparatus comprises:
   sequentially transmitting the first number of data frames to a data transmission module of the primary apparatus based on a transmission order corresponding to the first number of data frames, wherein the data transmission module comprises a plurality of first caching spaces for caching data frames;
   allocating a corresponding first caching space for the data frame transmitted to the data transmission module, and storing the data frame into the allocated first caching space for each data frame transmitted to the data transmission module; wherein the first caching space allocated for the data frame is a first idle caching space, and the previous first caching space adjacent thereto is currently occupied, and the next first caching space connected thereto is idle at present; and
   transmitting the data frame stored in the first caching space to the wireless communication apparatus when a transmission condition is satisfied;
   before sequentially transmitting the data frames to the data transmission module of the primary apparatus based on the transmission order corresponding to the first number of data frames, the data transmission method further comprises: caching the first number of data frames to a second caching space in the primary apparatus, wherein the second caching space is used for caching data frames; sequentially transmitting the data frames to the data transmission module of the primary apparatus based on the transmission order corresponding to the first number of data frames, comprising reading data frame from the second caching space corresponding to each data frame in sequence based on the transmission order corresponding to the first number of data frames, and transmitting the data frames to the data transmission module.

2. The method according to claim 1, wherein the transmitting the data frame stored in the first caching space to the wireless communication apparatus comprises:
   detecting whether the first caching space allocated to each of a plurality of target data frames is a first caching space that exists continuously, wherein a target data frame is a data frame transmitted to the data transmission module before satisfying the transmission condition, and the target data frame is a data frame in the first number of data frames;
   in the case where it is detected that the first buffer space allocated to each of the plurality of target data frames is not the continuously existing first buffer space, adjusting the first caching space allocated to each of a target data frames to store each of the target data frames in the continuously existing the first caching space; and transmitting the target data frames to the wireless communication apparatus according to the transmission order of the first caching space corresponding to each of the target data frames.

3. The method according to claim 1, wherein after transmitting the first number of data frames to the wireless communication apparatus, the method further comprises:
counting a total number of data frames that have been transmitted to the wireless communication apparatus every time after transmitting one data frame to the wireless communication apparatus; and releasing the second caching space corresponding to the data frame when the total number reaches a second threshold value.

4. The method according to claim 1, wherein after transmitting the first number of data frames to the wireless communication apparatus, the method further comprises:
releasing the second caching space corresponding to the data frame when a duration of transmission of the data frame to the wireless communication apparatus reaches a target duration every time after transmitting one data frame to the wireless communication apparatus.

5. The method according to claim 1, wherein the transmitting attribute information corresponding to a first number of data frames and number information carrying the first number to the wireless communication apparatus comprises:
transmitting the attribute information and the number information to the wireless communication apparatus based on a priority corresponding to the first number of data frames.

6. The method according to claim 5, wherein the retransmitting the first data frame comprises:
transmitting attribute information about all the first data frames and total amount information carrying the total amount of the first data frames to the wireless communication apparatus; wherein the attribute information of the first data frame and the total number information are used for performing aggregation processing on the first data frame; and
transmitting the first data frame to the wireless communication apparatus for the wireless communication apparatus.

7. The method according to claim 5, wherein the retransmitting the first data frame comprises:
taking both the data frame to be transmitted with the same priority as the first data frame and the first data frame as a data frame to be selected when another data frame to be transmitted with the same priority as the first data frame is also present; and
determining a first number of data frames from the data frames to be selected.

8. The method according to claim 1, wherein the transmitting attribute information corresponding to a first number of data frames and number information carrying the first number to the wireless communication apparatus comprises:
transmitting the attribute information and the number information to the wireless communication apparatus based on a priority corresponding to the first number of data frames.

9. The method according to claim 1, wherein after transmitting the first number of data frames to the wireless communication apparatus, the method further comprises:
performing retransmission processing on the first data frame after the first number of data frames are all transmitted to the wireless communication apparatus in the case where the wireless communication apparatus feeds back a retransmission notification for a first data frame, wherein the first data frame is a data frame in the first number of data frames which needs to be retransmitted to the wireless communication apparatus.

10. The method according to claim 1, wherein before transmitting attribute information corresponding to a first number of data frames and number information carrying the first number, the method further comprises:
determining a total amount of data frames to be transmitted having the same priority; and
setting the first number based on the total amount of data frames and the first threshold value.

11. A primary apparatus, comprising:
a processor; and
a memory comprising computer program instructions;
the memory and the computer program instructions are configured, together with the processor, to cause the primary apparatus to at least:
acquire a first threshold negotiated between a wireless communication device and a data receiving device;
determine a first quantity, wherein the first quantity is not greater than the first threshold;
transmit attribute information corresponding to a first number of data frames and number information carrying the first number to the wireless communication apparatus, wherein the attribute information and the number information are used for performing aggregation processing on the first number of data frames; and
transmit the first number of data frames to the wireless communication apparatus,
wherein the transmit the first number of data frames to the wireless communication apparatus comprises:
sequentially transmit the first number of data frames to a data transmission module of the primary apparatus based on a transmission order corresponding to the first number of data frames, wherein the data transmission module comprises a plurality of first caching spaces for caching data frames;
allocate a corresponding first caching space for the data frame transmitted to the data transmission module, and store the data frame into the allocated first caching space for each data frame transmitted to the data transmission module; wherein the first caching space allocated for the data frame is a first idle caching space, and the previous first caching space adjacent thereto is currently occupied, and the next first caching space connected thereto is idle at present; and
transmit the data frame stored in the first caching space to the wireless communication apparatus when a transmission condition is satisfied;
before sequentially transmit the data frames to the data transmission module of the primary apparatus based on the transmission order corresponding to the first number of data frames, the primary apparatus further comprises: cache the first number of data frames to a second caching space in the primary apparatus, wherein the second caching space is used for caching data frames; sequentially transmit the data frames to the data transmission module of the primary apparatus based on the transmission order corresponding to the first number of data frames, comprising read data frame from the second caching space corresponding to each data frame in sequence based on the transmission order corresponding to the first number of data frames, and transmit the data frames to the data transmission module.

* * * * *